United States Patent
Lavieville

(10) Patent No.: US 9,571,004 B2
(45) Date of Patent: Feb. 14, 2017

(54) MULTI-LEVEL POWER CONVERTER

(71) Applicant: SCHNEIDER TOSHIBA INVERTER EUROPE SAS, Pacy sur Eure (FR)

(72) Inventor: Jean-Paul Lavieville, Saint Lambert des Bois (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 14/683,431

(22) Filed: Apr. 10, 2015

(65) Prior Publication Data

US 2015/0333658 A1   Nov. 19, 2015

(30) Foreign Application Priority Data

May 13, 2014   (FR) .................................... 14 54238

(51) Int. Cl.
  *H02M 7/487* (2007.01)
  *H02M 7/537* (2006.01)
  *H02P 27/14* (2006.01)
  *H02M 7/483* (2007.01)

(52) U.S. Cl.
  CPC ............ *H02M 7/537* (2013.01); *H02M 7/483* (2013.01); *H02P 27/14* (2013.01); *H02M 7/487* (2013.01)

(58) Field of Classification Search
  CPC ...... H02M 7/537; H02M 7/483; H02M 7/487; H02P 27/14
  See application file for complete search history.

(56) References Cited

U.S. PATENT DOCUMENTS

| 7,573,732 B2 * | 8/2009 | Teichmann | H02M 1/32 363/37 |
| 2004/0095790 A1 * | 5/2004 | Bakran | H02M 7/487 363/132 |
| 2013/0051094 A1 * | 2/2013 | Bendre | H02M 7/49 363/71 |
| 2013/0094260 A1 * | 4/2013 | Martini | H02M 7/483 363/97 |

(Continued)

OTHER PUBLICATIONS

Multilevel Inverters: A Survey of Topologies, Controls, and Applications, José Rodríguez, Senior Member, IEEE, Jih-Sheng Lai, Senior Member, IEEE, and Fang Zheng Peng, Senior Member, IEEE;IEEE Transactions on Industrial Electronics, vol. 49, No. 4, Aug. 2002.*

(Continued)

*Primary Examiner* — Shawki S Ismail
*Assistant Examiner* — Muhammad S Islam
(74) *Attorney, Agent, or Firm* — Oblon, McClelland, Maier & Neustadt, L.L.P.

(57) ABSTRACT

This is a multi-level converter comprising at least one arm (B) formed of n stages (Et1, Et2, . . . , Etn) mounted in cascade. The first stage (Et1) comprises a single switching structure (Ce10) with four voltage levels and an ith stage (i lying between two and n) comprises i identical switching structures (Cei1, Cei2, . . . Ceii) with four voltage levels, mounted in series. Each switching structure with four voltage levels comprises a cell of floating capacitor type (T1, T2, T1', T2', C12), two basic switching cells (T3u, T3'u; T3l, T3'l) and a capacitive divider bridge (C9, C10, C11), the basic switching cells being connected between the voltage divider bridge and the cell of floating capacitor type.

10 Claims, 10 Drawing Sheets

(56) References Cited

U.S. PATENT DOCUMENTS

| | | | | |
|---|---|---|---|---|
| 2013/0095790 | A1* | 4/2013 | Park | H04W 4/02 |
| | | | | 455/411 |
| 2013/0249322 | A1* | 9/2013 | Zhang | H02M 7/483 |
| | | | | 307/151 |

OTHER PUBLICATIONS

French Preliminary Search Report issued Jan. 20, 2015 in French Application 14 54238, filed on May 13, 2014 (with English Translation of Categories of Cited Documents and Written Opinion).

Fang Zheng Peng "A Generalized Multilevel Inverter Topology with Self Voltage Balancing", IEEE Transactions on Industry Applications, vol. 37, No. 2, Mar. 1, 2001, 8 pages.

Kui Wang et al. "A Four-level Hybrid-Clamped Converter with Natural Capacitor Voltage Balancing Ability", IEEE Transactions on Power Electronics, vol. 29, No. 3, Mar. 1, 2014, 11 pages.

Fang Z. Peng et al. "Recent Advances in Multilevel Converter/Inverter Topologies and Applications", 2010 International Power Electronics Conference, Jun. 21, 2010, 10 pages.

Sergio Busquets-Monge et al. "A Multilevel Active-Clamped Converter Topology-Operating Principle", IEEE Transactions on Industrial Electronics, vol. 58, No. 9, Sep. 2011, 11 pages.

* cited by examiner

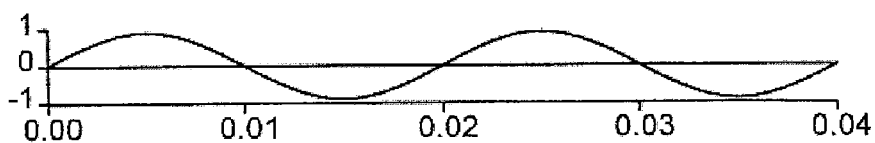
FIG. 4.1
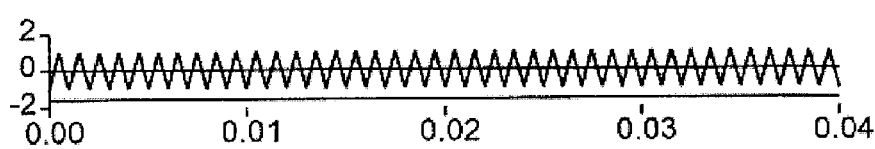
FIG. 4.2
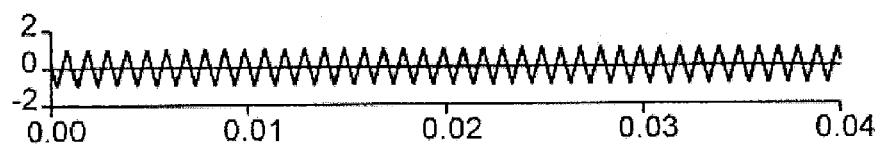
FIG. 4.3
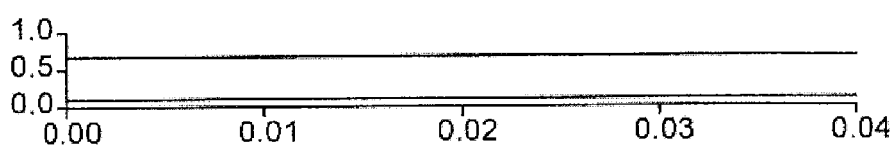
FIG. 4.4
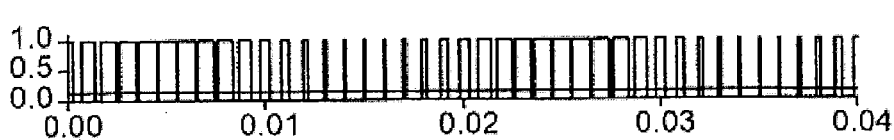
FIG. 4.5
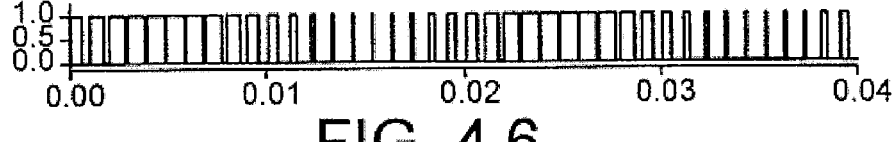
FIG. 4.6
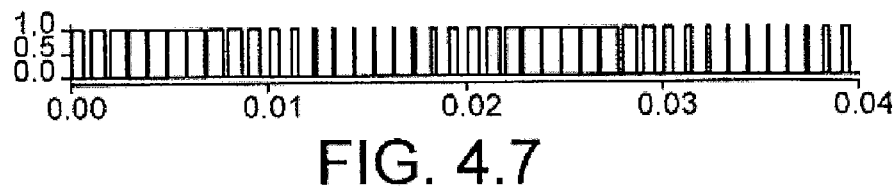
FIG. 4.7

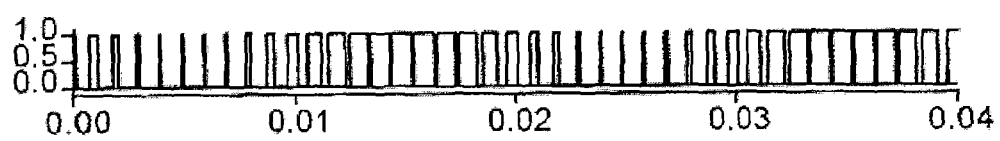
FIG. 4.8
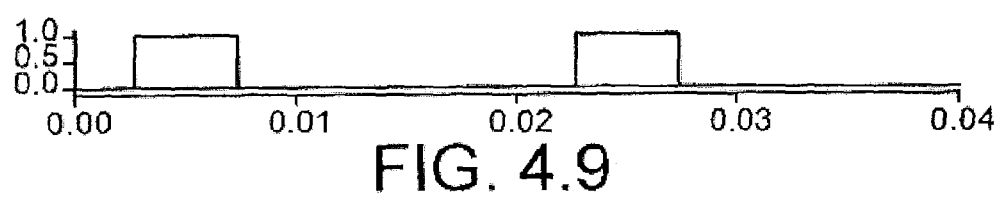
FIG. 4.9
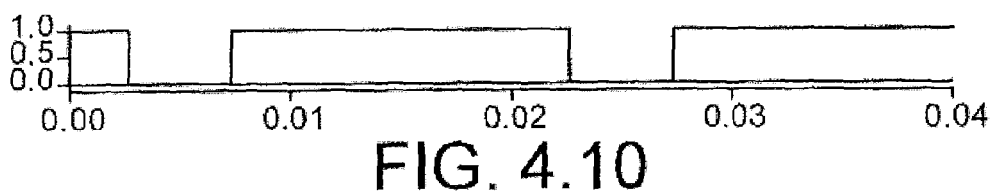
FIG. 4.10
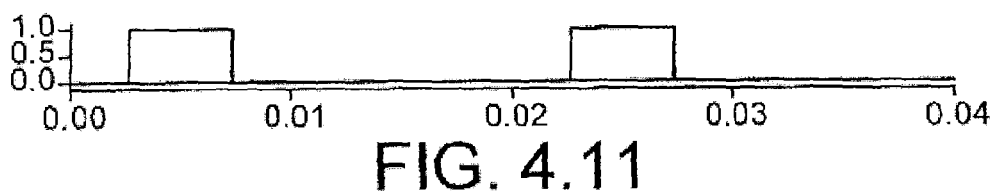
FIG. 4.11
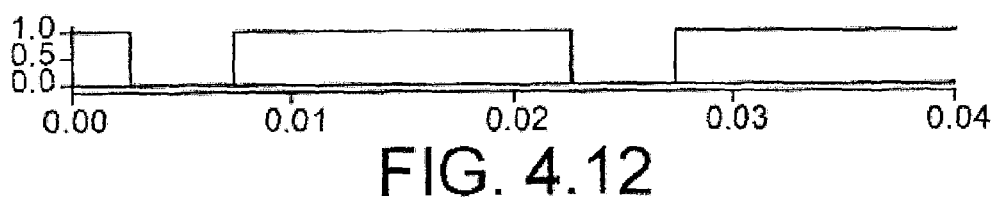
FIG. 4.12

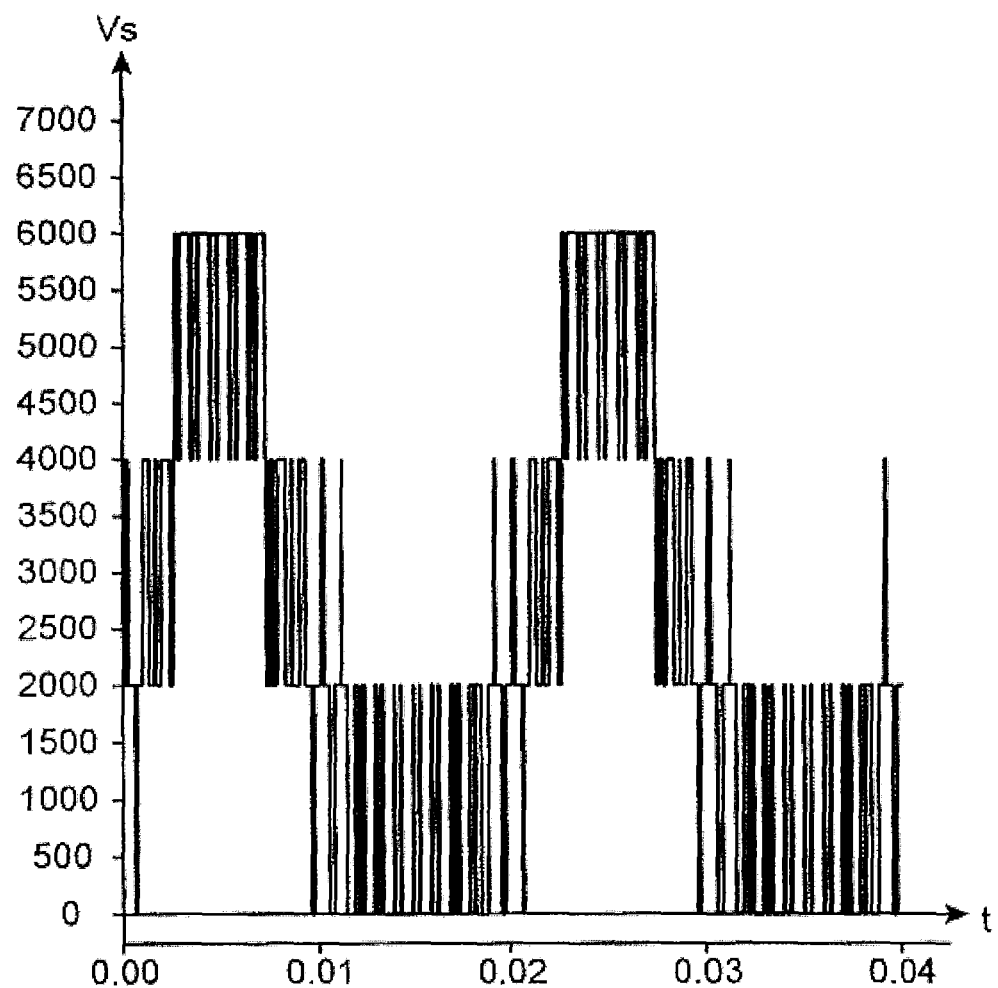
FIG. 4.13

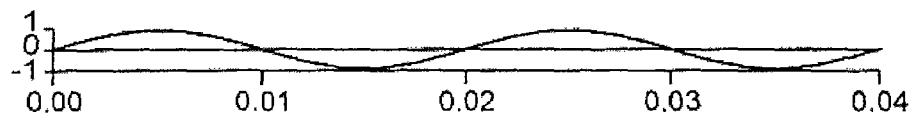
FIG. 5.1
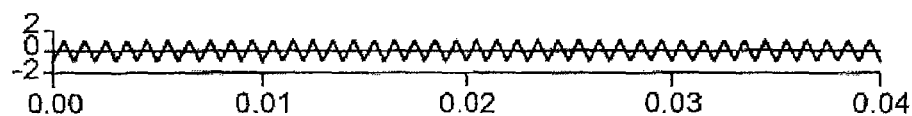
FIG. 5.2
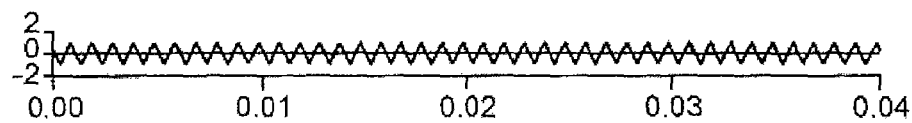
FIG. 5.3
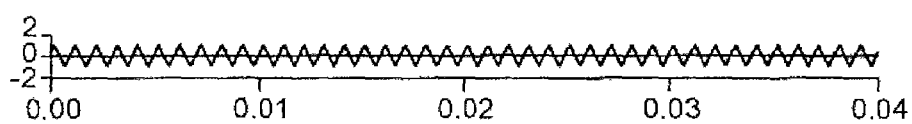
FIG. 5.4
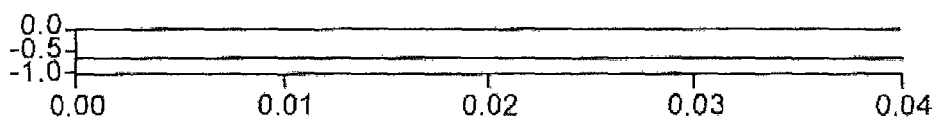
FIG. 5.5
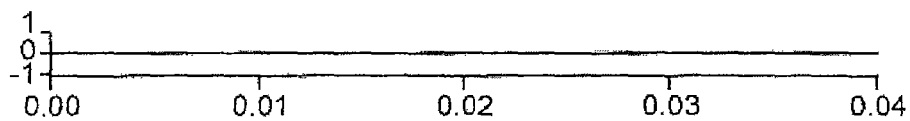
FIG. 5.6
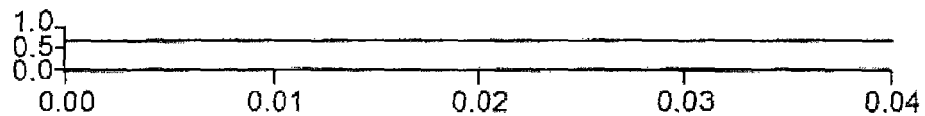
FIG. 5.7

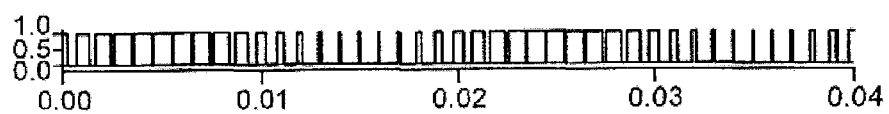
FIG. 5.8
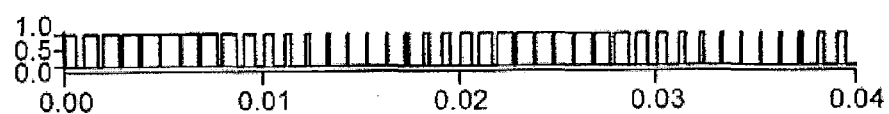
FIG. 5.9
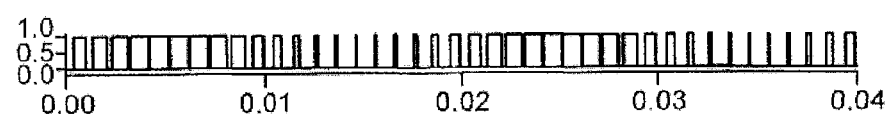
FIG. 5.10
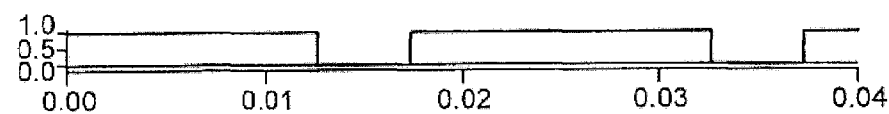
FIG. 5.11
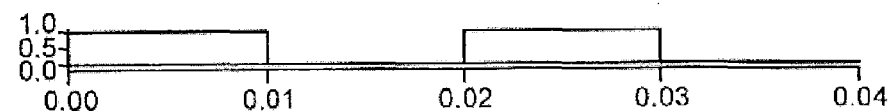
FIG. 5.12
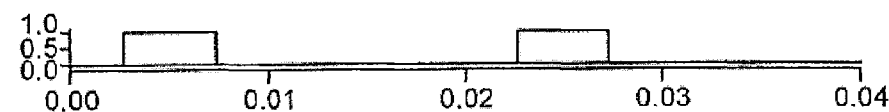
FIG. 5.13

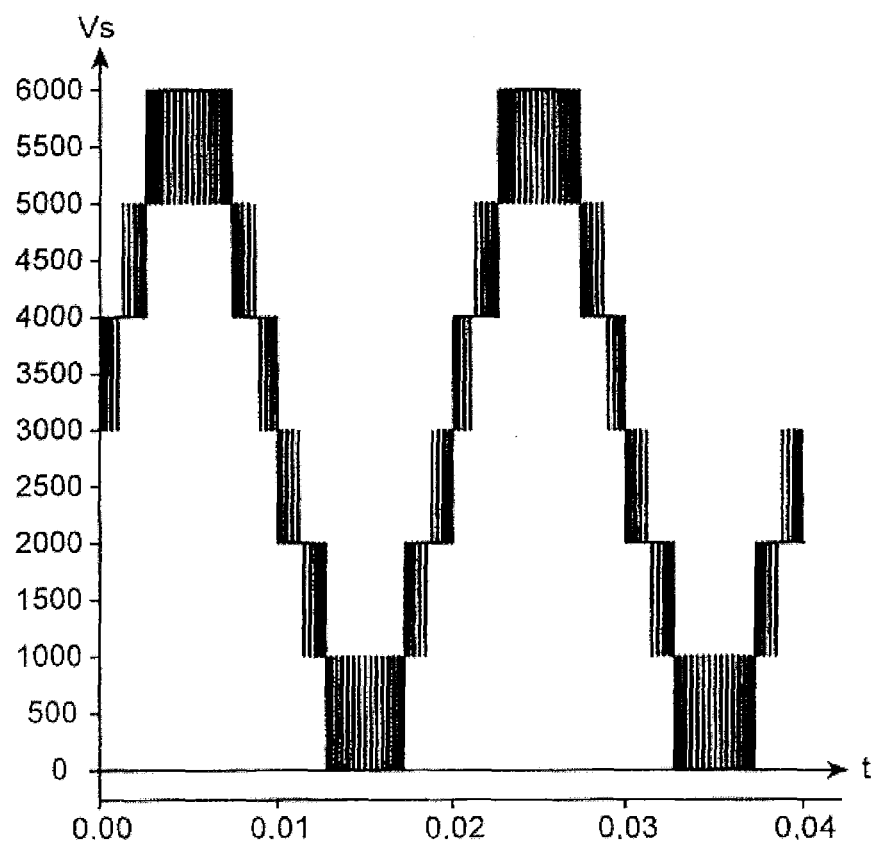
FIG. 5.14
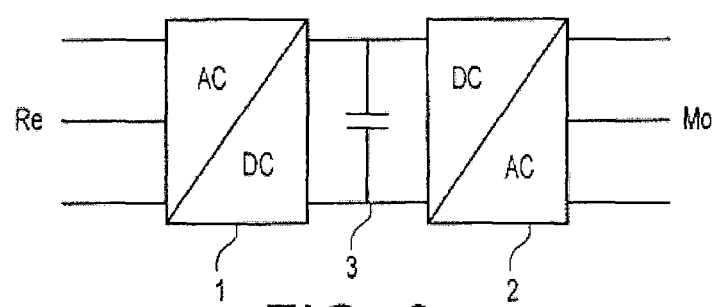
FIG. 6

MULTI-LEVEL POWER CONVERTER

TECHNICAL FIELD

The present invention relates to multi-level power converters more particularly intended to operate in the medium voltage range.

PRIOR ART

Known medium voltage power converters generally use semi-conductor switches placed in series to allow an increase in voltage. The major difficulty with placing these semi-conductor switches in series is of obtaining identical voltages across the terminals of all these semi-conductor switches at each instant. If transient or permanent overloads arise, the destruction of the semi-conductor switches may occur.

Techniques based on the interleaving of the controls of the switches associated with the use of transformers have been developed; they make it possible to manage the distribution of the voltages and to reconstruct the waveforms. But the transformers have a non-negligible cost and they prevent the realization of compact converters.

Another solution has arisen, i.e. cells of NPC (neutral point clamped) type with two pairs of semi-conductor switches in series, two diodes in series connected on one side to the common point between the two switches of the first pair and on the other to the common point between the two switches of the second pair. A series of two capacitors, which is connected to the terminals of the assembly formed by the pairs of semi-conductor switches, is moreover found. The common point between the two diodes in series is linked to the common point between the two capacitors of the series.

This type of cell leads to a satisfactory waveform and to a reduction in the voltage constraints on the semi-conductor switches. On the other hand, unbalances in the voltage across the terminals of the capacitors may occur.

Improvements to the NPC original topology have occurred, by replacing the two diodes with a pair of semi-conductor switches. This topology is called ANPC with 3 voltage levels.

To further increase the acceptable voltage level, it has been proposed to place more switches in series and to add capacitors, which leads to the topology called ANPC with 5 voltage levels. The cells of 5 voltage levels of ANPC type are currently limited to voltage levels of the order of 6.9 kV, which is not necessarily sufficient.

Modular multi-level converters (MMC) are also known, in which each arm to be mounted across the terminals of a DC voltage source comprises two assemblies in series, having a common terminal to be linked to an AC current source. Each assembly comprises several modules, each formed of at least two elementary switches in series and of a capacitor connected in parallel with them. A connection is effected between the point common to the two elementary switches of a module and an end of the series of elementary switches of a neighbouring module. As a function of the enabled or disabled state of the elementary switches of a module, the capacitor is short-circuited or in the circuit. The capacitors have the same value and an identical voltage withstand equal to the ratio between the DC voltage applied to an arm, divided by the number of modules of the arm. The value of the capacitors depends on the frequency of the AC side output signal in the case of inverter operation or the input signal in the case of rectifier operation. Their voltage withstand is limited, thus making it possible to limit the overvoltages generated by their spurious inductances. In the case of a variable speed drive, the power supply frequency of a motor varies from zero to the nominal value, thus implying that it is not possible to have a capacitor of reasonable value.

It has also been proposed to produce cells of floating capacitor type, also known as nested elementary cells. Such a cell of floating capacitor type makes it possible to link a voltage source to a current source by associating an arbitrary number of elementary cells in series. Each elementary cell comprises two semi-conductor switches in series and a capacitor links together two neighbouring elementary cells in a ladder-like manner. However, this solution exhibits drawbacks related to the presence of the floating capacitor between two elementary cells. The greater the number of elementary cells, the greater the cost overhead related to the capacitors and the larger the quantity of energy stored in these capacitors. The capacitors have the same value, but different voltage withstands, the voltage withstand increases with the rank of the elementary cell, and it equals kE/n, k being the rank of the elementary cell, n being the total number of elementary cells and E the applied voltage at the input of the elementary cell of rank one. The value of the capacitors is essentially related to the chopping frequency. The size of the capacitors is all the larger the higher their voltage withstand. The same holds for the spurious inductance that they possess. These spurious inductances result in switching overvoltages, and higher overvoltages will therefore occur on the elementary cells of high rank.

In articles [1], [2], whose references are to be found at the end of the description, there has been proposed a cell with three semi-conductor switches in series making it possible to obtain 4 voltage levels including a cell of floating capacitor type. It is however limited at present, with existing semi-conductor switches, to voltage levels of the order of 6.6 kV, which is not sufficient in certain applications, this level corresponding only to a fraction of the useful span of the medium voltage. The number of voltage levels affects the withstand over time of the insulators of a motor powered by the cell. The smaller the number of voltage levels, the more the lifetime of the insulators is reduced. They are subjected to voltage tiers of significant amplitude.

ACCOUNT OF THE INVENTION

The aim of the present invention is to propose a multi-level converter able to work at voltage levels above those of the prior art, without needing either to resort to transformers or to increase the number of semi-conductor switches placed in series.

Another aim of the invention is to propose a multi-level converter which is less expensive and more reliable than the multi-level converters of the prior art, for a given voltage level.

Yet another aim of the invention is to propose a multi-level converter which uses batches of standard capacitors with limited voltage withstand.

An additional aim of the invention is to propose a multi-level converter which limits the occurrence of spurious inductances and their influence.

To achieve this the present invention proposes to produce a multi-level converter comprising at least one arm formed of several stages of rank one to n (n an integer greater than one) mounted in cascade, the stage of rank 1 being intended to be connected to a current source and the stage of rank n being intended to be connected to a voltage source. The stage of rank one comprises a single switching structure with four voltage levels. A stage of rank i (i lying between two and n) comprises i identical switching structures with four voltage levels mounted in series. Each of these switching structures comprises a cell of floating capacitor type with three voltage levels comprising a quadruplet of elementary switches in series possessing a middle node, two basic cells each formed of a pair of elementary switches in series exhibiting two extreme terminals and a midpoint and a capacitive divider bridge having two ends comprising a triplet of energy storage devices mounted in series, of which two energy storage devices are in the extreme position. Each energy storage device in the extreme position is connected to the extreme terminals of a different basic switching cell, and a midpoint of each basic switching cell is connected to a different end of the quadruplet of elementary switches. The middle node of each cell of floating capacitor type of the stage of rank i is connected to an end of the capacitive divider bridge of a switching structure with four voltage levels of the stage of rank i-1.

The converter thus defined makes it possible to attain a voltage level of the order of 13.8 kV with the currently available switches having limited withstand voltage (6.5 kV), while limiting the number of stages to two and therefore using only six elementary switches in series.

To voltage balance the switching structures with four voltage levels, the energy storage devices of one and the same capacitive divider bridge have one and the same energy storage capacity and one and the same voltage withstand.

To comply with the rules of connection between voltage source and current source, the middle node of at least one cell of floating capacitor type of the stage of rank i is connected to an end of the capacitive divider bridge of the stage of rank i-1 via an inductor.

When several inductors link the stage of rank i to the stage of rank i-1, these inductors have one and the same value.

The two pairs of elementary switches of the two basic switching cells of one and the same stage possess one and the same switching function.

During operation, the elementary switches of one and the same pair are always in complementary states to within a dead time value.

In the quadruplet of elementary switches of a cell of floating capacitor type, two are in the extreme position and two are in the median position, the two elementary switches in the extreme position are always in complementary states and the two elementary switches in the median position are always in complementary states, one being enabled and the other being disabled.

The elementary switches each comprise a controllable electronic power switch associated with a diode connected in antiparallel.

The energy storage devices are chosen from among a capacitor, a battery, and a fuel cell.

The present invention also relates to a variable speed drive comprising a cascade with a converter thus characterized operating as AC/DC rectifier and a converter thus characterized operating as DC/AC inverter, linked together by their DC sides by way of a voltage source.

BRIEF DESCRIPTION OF THE DRAWINGS

The present invention will be better understood on reading the description of exemplary embodiments given purely by way of wholly non-limiting indication while referring to the appended drawings in which:

FIG. 4.1 to 4.13 illustrate timecharts of the setpoint signal Vref (FIG. 4.1), of the carriers used with the setpoint voltage Vref for the control of the elementary switches of the switching structure with 4 voltage levels of FIG. 2: K1, K1' (FIG. 4.2), K2, K2' (FIG. 4.3), K3u, K3'u, K3l, K3'l (FIG. 4.4), of the control signals of the elementary switches of the switching structure with 4 voltage levels of FIG. 2: K1 (FIG. 4.5), K1' (FIG. 4.6), K2 (FIG. 4.7), K2' (FIG. 4.8), K3u (FIG. 4.9), K3'u (FIG. 4.10), K3l (FIG. 4.11), K3'l (FIG. 4.12), of the output voltage Vs of the switching structure with 4 voltage levels (FIG. 4.13), in DC/AC conversion operation;

FIG. 5.1 to 5.14 illustrate timecharts of the setpoint signal Vref (FIG. 5.1), of the carriers used with the setpoint voltage Vref for the control of the elementary switches of the arm of the multi-level converter of FIG. 3A: T1, T1' (FIG. 5.2), T2, T2' (FIG. 5.3), T3u, T3'u, T3l, T3'l (FIG. 5.4), T4u, T4'u, T4l, T4'l (FIG. 5.5), T5u, T5'u, T5l, T5'l (FIG. 5.6), T6u, T6'u, T6l, T6'l, T7u, T7'u, T7l, T7'l (FIG. 5.7), of the switching functions used for the control of the elementary switches of the arm of the multi-level converter of FIG. 3A: F10 (FIG. 5.8), F20 (FIG. 5.9), F30 (FIG. 5.10), F40 (FIG. 5.11), F50 (FIG. 5.12), F60 (FIG. 5.13), of the output voltage Vs of the arm of the multi-level converter of FIG. 3A (FIG. 5.14) in DC/AC conversion operation;

FIG. 6 illustrates an exemplary variable speed drive associating two multi-level converters which is the subject of the invention, one operating as a rectifier and the other as an inverter.

DETAILED ACCOUNT OF PARTICULAR EMBODIMENTS

Figure 1A:
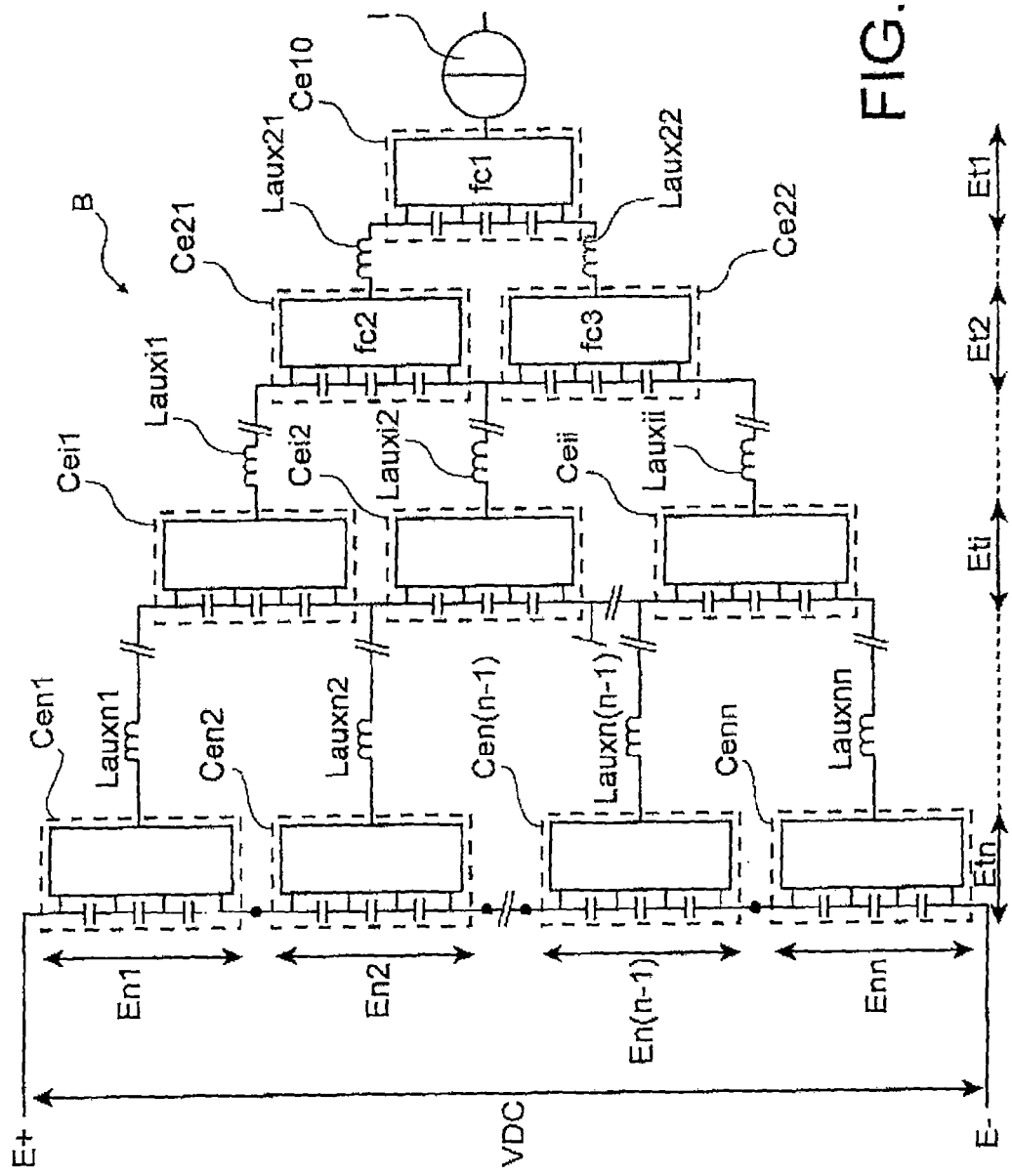
FIG. 1A illustrates, in a very schematic manner, a multi-level converter arm which is the subject of the invention with n stages mounted in cascade.

Reference is made to FIG. 1A which shows an electrical diagram of an arm B of a multi-level converter which is the subject of the invention, in a general structure. It makes it possible to work at voltages from the medium voltage range up to about 13.8 kV whereas the voltage withstand of semi-conductor switches existing today is limited to 6.5 kV.

It will be described initially in an example of a DC/AC converter arm.

Figure 1B:
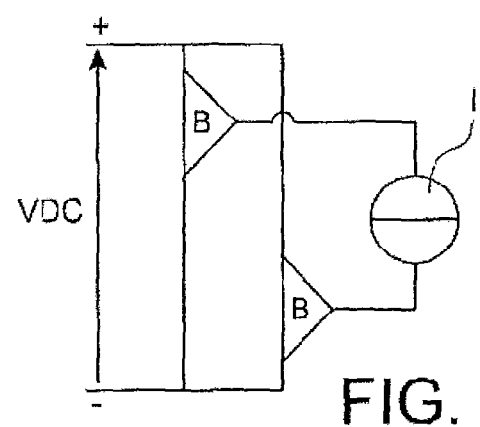
FIG. 1B is a single-phase multi-level converter comprising two arms that are similar to that of FIG. 1A.

The multi-level converter which is the subject of the invention, such as that illustrated in FIG. 1B, comprises one or more arms B similar to that represented in FIG. 1A. They are intended to each be wired up between two like electrical power supply sources, including a voltage source VDC and a current source I. Two arms are used in a single-phase converter. Three arms would be used in a three-phase converter.

The arm B of FIG. 1A is intended to be connected between the voltage source VDC and the current source I. The converter can then operate as a DC/AC converter (inverter) or else as an AC/DC converter (rectifier). In the case of a DC/AC converter, the current source is alternating and may be for example an electric motor for example, and the voltage source is direct and may be for example a direct current bus wired up to the output of a rectifier.

In the case of an AC/DC converter, the current source is alternating and may be for example the power supply network and the voltage source is direct and may be for example a capacitor or a battery.

The converter arm B comprises n stages Et1, Et2, ... Eti, ... Etn connected together in cascade. n is an integer number greater than or equal to two. The first stage Et1 or output stage, in the inverter application, is intended to be wired up to the current source I. It is represented formed of a resistor R and of an inductor L in series in FIG. 3A.

The stage of rank n Etn or input stage, in the inverter application, is intended to be wired up to the voltage source VDC.

In an AC/DC converter configuration, the first stage Et1 or input stage would be wired up to a current source and the stage of rank n Etn or input stage would be wired up to a voltage source. The input and the output of the converter are reversed when toggling from inverter operation to rectifier operation and vice versa.

The description which follows is based on FIG. 1A and operation in the guise of DC/AC converter.

The stage of rank one Et1 comprises a single switching structure with four voltage levels Ce10.

A stage of rank i (i an integer lying between 2 and n) Eti comprises i identical switching structures with four voltage levels Cei1, Cei2 ... Ceii connected in series. Each of the i switching structures with four voltage levels Cei1, Cei2 ... Ceii of the stage of rank i Eti is linked by way of an inductor Lauxi1, Lauxi2, ... , Lauxii to the stage of rank i−1. The stage of rank i−1 is not represented. Thus in FIG. 1A, the stage of rank 2, Et2 comprises two switching structures with four voltage levels Ce21, Ce22 which are linked via two inductors Laux21, Laux22 to the stage of rank 1 Et1.

The stage of rank n Etn comprises n switching structures with four voltage levels Cen1, Cen2, ... Cen(n−1), Cenn which are linked via n inductors Lauxn1, Lauxn2, ... Lauxn(n−1), ... Lauxnn to the stage of rank n−1. The stage of rank i−1 is not represented. Each of these inductors can be regarded as a current source so as to comply with the rules of connection between voltage source and current source. The inductors which link two like stages are of the same value. On the other hand, inductors which do not link two like stages do not necessarily have the same values, but for the sake of simplification, it is possible to choose them to have the same value.

It is possible for the linking of a switching structure of a stage of arbitrary rank to the stage which precedes it to be effected directly without the presence of an inductor. It suffices that one or more inductors remain between this stage of arbitrary rank and the stage which precedes it. The inductor or inductors which remain will then have an increased value with respect to that which they would have if all the inductors were present between the two stages. Matters are contrived such that the total value of the inductors which link two successive stages are the same whatever the number of inductors. To illustrate this principle, the inductor Laux22 has been represented dotted in FIG. 1A, thereby signifying that it can be omitted.

It is appreciated that the voltage VDC applied to the stage of rank n Etn has been split into n equal voltages associated in series. These are the input voltages of the switching structures with four voltage levels of the stage of rank n. These voltages are referenced En1, En2, En(n−1), Enn.

Figure 3A:
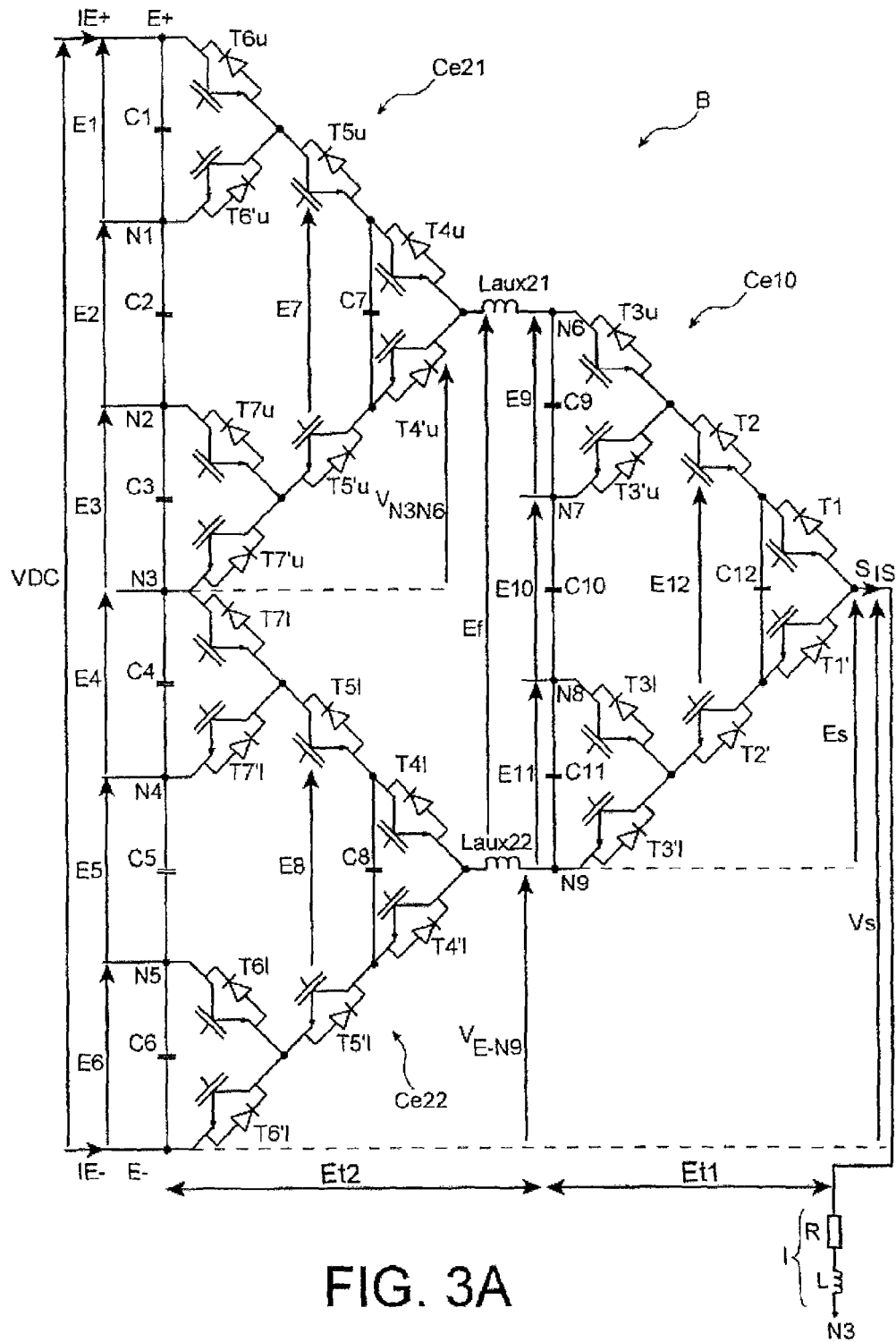
FIG. 3A shows an arm of a converter which is the subject of the invention with two stages in inverter operation and FIG. 3B shows an arm of a converter which is the subject of the invention with two stages in rectifier operation.

Each switching structure with four voltage levels Ce10 to Cenn comprises, as will be seen further on, by referring to the description of FIG. 3A, a capacitive divider bridge which manifests a voltage source. These capacitive divider bridges are referenced Ca10, for the switching structure with four voltage levels Ce10.

As a variant, it is possible for the voltage source VDC to be formed of n elementary voltage sources each wired up to one of the n switching structures with four voltage levels Cen1, ... Cenn of the stage n Etn, across the terminals of each of the capacitive divider bridges. The voltages En1, En2, En(n−1), En are the voltages across the terminals of the capacitive divider bridges of the stage of rank n.

The outputs of the switching structures with four voltage levels Cen1 to Cenn are considered to be floating voltage sources. They are connected via the inductors to the capacitive divider bridges of the switching structures with four voltage levels of the stage of rank n−1. These switching structures with four voltage levels of the stage of rank n−1 are also considered to be floating voltage sources. The inductors between the stage of rank n and the stage of rank n−1 can be regarded as current sources so as to comply with a voltage source-current source alternation.

The components of the nth stage Etn are chosen in such a way that the input voltage VDC is split into n equal input voltages applied to each of the n switching structures with four voltage levels Cen1 to Cenn. Thus VDC/n is applied to each of the switching structures with four voltage levels of the nth stage Etn.

It is possible to define a conversion function f associated with each switching structure with four voltage levels; it relates the input voltage Ve applied to said switching structure with four voltage levels to the voltage Vs present at the output of the same said switching structure. Vs=f*Ve with −1≤f≤1

In each stage, the switching structures with four voltage levels are configured and controlled in such a way that their associated conversion functions are equal. Hence, the voltages applied at the input of each of the switching structures with four voltage levels are equal to VDC/n. All the switching structures with four voltage levels of the converter must support this voltage VDC/n. This addresses the initial objective of reducing the voltage constraints on the semi-conductor switches for a given DC voltage applied to the stage of rank n.

A switching structure with four voltage levels of the multi-level converter which is the subject of the invention will be described while referring to FIG. 2. This switching structure with four voltage levels comprises a cell of floating capacitor type 20 with three voltage levels, a first and a second basic switching cell 21 and 22 and a capacitive divider bridge 23.

The cell of floating capacitor type 20 comprises a quadruplet of elementary switches mounted in series called K1, K2, K1', K2'. In this quadruplet, a first elementary switch K2 and a second elementary switch K2' are in the extreme position and a first elementary switch K1 and a second elementary switch K1' are in the median position; the two elementary switches K1, K1' in the median position are linked directly to one another at a middle node M. In the quadruplet, an elementary switch in the extreme position is linked directly to an elementary switch in the median position. This link makes it possible to define a first midpoint M1 between the first elementary switch K2 in the extreme position and the first elementary switch K1 in the median position and a second midpoint M1' between the second elementary switch K2' in the extreme position and the second elementary switch K1' in the median position. The ends of the quadruplet of switches K1, K2, K1', K2' in series are called M2 and M2', the end M2 being on the side of the elementary switch K2 and the end M2' being on the side of the elementary switch K2'.

An energy storage device C is connected between the first midpoint M1 and the second midpoint M1'.

Two switching functions are defined in the cell of floating capacitor type 20. The first switching function F1 is used for the control of a first pair of switches comprising the first elementary switch K1 in the median position and the second elementary switch in the median position K1'. The second switching function F2 is used for the control of a second pair of switches comprising the first elementary switch K2 in the extreme position and the second elementary switch K2' in the extreme position. The two elementary switches of one and the same pair are always in complementary states, enabled or disabled, to within a dead time value. This dead time will be explained subsequently in conjunction with FIG. 5.

The elementary switches K1, K2, K1', K2' of the cell of floating capacitor type 20 are semi-conductor switches and each comprise a controllable electronic power switch Tr1, Tr2, Tr1', Tr2', such as an IGBT (Insulated Gate Bipolar Transistor) power transistor for example associated with a diode D1, D2, D1', D2' connected in antiparallel. Instead of IGBT transistors, other electronic power switches such as MOSFET transistors or the like are conceivable.

The switching function F1 equals 1 when the elementary switch K1 is enabled and the elementary switch K1' is disabled and equals 0 when the elementary switch K1 is disabled and the elementary switch K1' is enabled.

The switching function F2 equals 1 when the elementary switch K2 is enabled and the elementary switch K2' is disabled and equals 0 when the elementary switch K2 is disabled and the elementary switch K2' is enabled.

Each of the basic switching cells 21, 22 comprises a pair of elementary switches mounted in series. They are referenced K3u, K3'u for the first basic switching cell 21 and K3l, K3'l for the second basic switching cell 22. In a pair, the two elementary switches have a midpoint. For the basic switching cell 21, the midpoint is connected to the end M2 of the quadruplet of the cell of floating capacitor type 20. For the basic switching cell 22, the midpoint is connected to the end M2' of the quadruplet of the cell of floating capacitor type 20.

Each basic switching cell 21, 22 also comprises a first and a second extreme terminal. The first extreme terminal is called M3, and the second extreme terminal is called M4 for the first basic switching cell 21. The first extreme terminal is called M3', and the second extreme terminal is called M4' for the second basic switching cell 22. The first two extreme terminals M3 and M3' form the two input terminals of the switching structure with four voltage levels, whereas the terminal M forms the output terminal in DC/AC conversion operation.

The elementary switches K3u, K3'u, K3l, K3'l of the two basic switching cells 21, 22 are also semi-conductor switches and each comprise a controllable electronic power switch, such as an IGBT (Insulated Gate Bipolar Transistor) power transistor, for example, associated with a diode connected in antiparallel. These diodes and power transistors have not been referenced so as not to overload the figure. Instead of IGBT transistors, other electronic power switches such as MOSFET transistors or the like are also conceivable.

A third switching function F3 is defined for controlling the elementary switches of the basic switching cells 21 and 22. The elementary switch K3u and the elementary switch K3l are controlled in an identical manner. The two elementary switches K3u, K3'u of the basic switching cell 21 are always in opposite states. The same holds for the elementary switches K3l, K3'l of the basic switching cell 22.

The switching function F3 equals 1 when the elementary switches K3u, K3l are enabled and the elementary switches K3'u, K3'l are disabled and equals 0 when the elementary switches K3u, K3l are disabled and the elementary switches K3'u, K3'l are enabled.

The capacitive divider bridge 23 comprises a triplet of energy storage devices C100, C200 and C300 connected in series. The first energy storage device C100 is mounted across the terminals of the first basic switching cell 21, between its extreme terminals M3, M4. The third energy storage device C300 is mounted across the terminals of the second basic switching cell 22, between its first and its second extreme terminals M3', M4'. The second energy storage device C200 is mounted between the first basic switching cell 21 and the second basic switching cell 22, between the second extreme terminals of these basic switching cells. The capacitive divider bridge 23 possesses two extreme terminals M3 and M'3 which are common respectively to the first basic switching cell 21 and to the second basic switching cell 22.

The energy storage devices of this switching structure with four voltage levels are chosen from among a capacitor, a battery, and a fuel cell. The storage devices of the capacitive divider bridge 23 have the same storage capacity and one and the same voltage withstand.

Figure 2:
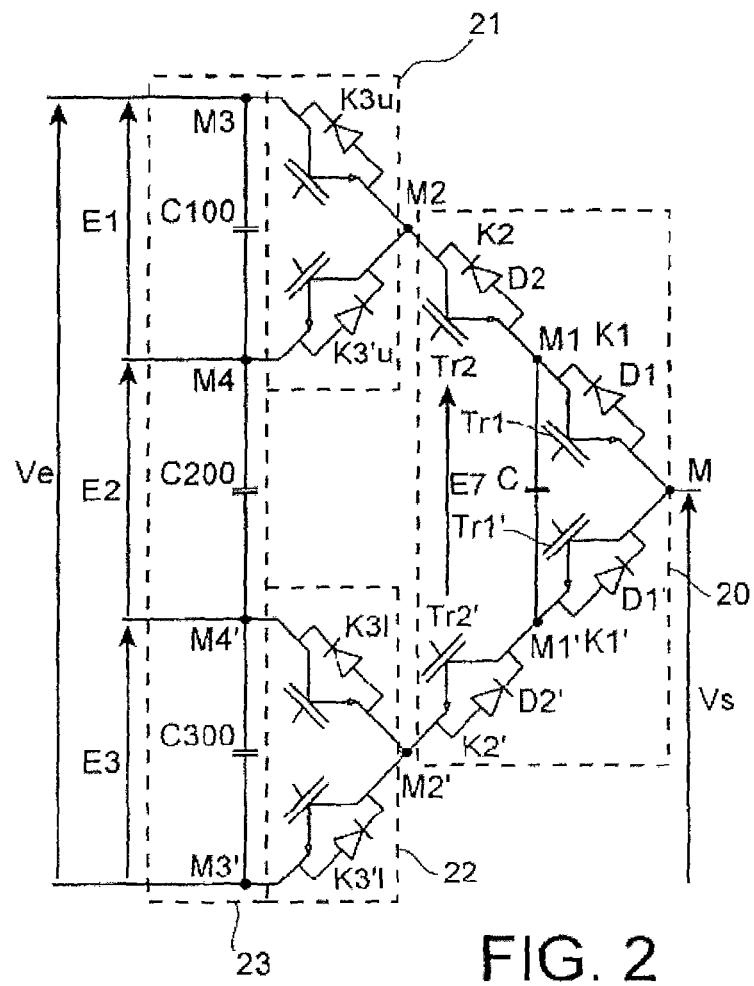
FIG. 2 shows one of the switching structures with 4 voltage levels of the multi-level converter which is the subject of the invention.

Depending on the states of the elementary switches of the switching structure of FIG. 2, the switching structure with four voltage levels can take eight different states which lead to four different voltage levels: 0, Ve/3, 2Ve/3, Ve.

The following table groups together these eight different states numbered from 1 to 8. The switching function f mentioned above depends on the switching functions F1, F2 and F3.

| State | F1 | F2 | F3 | Vs |
|---|---|---|---|---|
| 1 | 0 | 0 | 0 | 0 |
| 2 | 1 | 0 | 1 | Ve/3 |
| 3 | 0 | 1 | 0 | Ve/3 |
| 4 | 1 | 1 | 1 | 2 Ve/3 |
| 5 | 0 | 0 | 0 | Ve/3 |
| 6 | 1 | 0 | 1 | 2 Ve/3 |
| 7 | 0 | 1 | 0 | 2 Ve/3 |
| 8 | 1 | 1 | 1 | Ve |

With the foregoing, the input voltage Ve which is applied to the terminals of the capacitive divider bridge 23 is subdivided into three equal voltages E1, E2, E3 which are each applied respectively across the terminals of one of the energy storage devices C100, C200, C300. The output voltage Vs is expressed by:

$$Vs=(F1+F2+F3)Ve/3$$

The voltage Vs is taken between the node M and the node M'3.

In FIG. 4.1 has been represented the shape of the setpoint signal also called the setpoint voltage Vref which will serve in particular to determine the switching instants of all the elementary switches of the switching structure with four voltage levels illustrated in FIG. 2. This setpoint voltage Vref will be used in several comparisons, as will be seen subsequently. It is sinusoidal and the voltage the output voltage Vs which is illustrated in FIG. 4.13, is in phase with this setpoint voltage Vref.

In FIG. 4.2 has been represented a timechart of the carrier Car1 used with the setpoint voltage Vref to achieve the switching function F1 and determine the switching instants of the elementary switches K1, K1' of the cell of floating capacitor type 20. It is a triangular carrier whose amplitude lies between −1 and +1.

In FIG. 4.3 has been represented a timechart of the carrier Car2 used with the setpoint voltage Vref to achieve the switching function F2 and determine the switching instants of the elementary switches K2, K2' of the cell of floating capacitor type 20. It is a triangular carrier whose amplitude lies between −1 and +1. The two carriers Car1 and Car2 are half a chopping period out of phase. The chopping frequency is much higher than the frequency of the output voltage Vs illustrated in FIG. 2.

In FIG. 4.4 has been represented a timechart of the carrier Car3 used with the setpoint voltage Vref to achieve the switching function F3 and determine the switching instants of the elementary switches K3$u$, K3'$u$, K3$l$, K3'$l$ of the basic switching cells 21, 22. This is a constant signal of amplitude 0.6.

The switching instants of the elementary switches are obtained by comparison between the triangular carriers and constant carrier and the setpoint signal Vref. It is possible to define as rule, for example, that a switching instant of an elementary switch arises as soon as the setpoint signal is strictly greater than the carrier. It would of course have been possible to fix as rule that a switching instant of an elementary switch arises as soon as the setpoint signal is greater than or equal to the carrier.

FIG. 4.5 is a timechart of the control signal of the elementary switch K1 of the cell of floating capacitor type 20. This is a notched signal whose period is equal to that of the setpoint signal Vref. The elementary switch K1 is enabled as long as the setpoint voltage Vref is greater than the carrier Car1.

FIG. 4.6 is a timechart of the control signal of the elementary switch K1' of the cell of floating capacitor type 20. This is a notched signal in phase opposition with respect to the control signal of the elementary switch K1 to within a dead time value.

FIG. 4.7 is a timechart of the control signal of the elementary switch K2 of the cell of floating capacitor type 20. This is a notched signal whose period is equal to that of the setpoint signal Vref. The elementary switch K2 is enabled as long as the setpoint voltage Vref is greater than the carrier Car2.

FIG. 4.8 is a timechart of the control signal of the elementary switch K2' of the cell of the cell of floating capacitor type 20. This is a notched signal in phase opposition with respect to the control signal of the elementary switch K2 to within a dead time value.

FIG. 4.9 is a timechart of the control signal of the elementary switch K3$u$ of the basic switching cell 21. This is a notched signal whose period is equal to that of the setpoint signal Vref. The elementary switch K3$u$ is enabled as long as the setpoint voltage Vref is greater than the carrier Car3. It is enabled just once per period of the setpoint signal Vref.

FIG. 4.10 is a timechart of the control signal of the elementary switch K3'$u$ of the basic switching cell 21. This is a notched signal in phase opposition with respect to the control signal of the elementary switch K3$u$ to within a dead time value.

FIG. 4.11 is a timechart of the control signal of the elementary switch K3$l$ of the basic switching cell 22. This is a notched signal whose period is equal to that of the setpoint signal Vref. The elementary switch K3$l$ is enabled as long as the setpoint voltage Vref is greater than the carrier Car3. It is enabled just once per period of the setpoint signal Vref.

FIG. 4.12 is a timechart of the control signal of the elementary switch K3'$l$ of the basic switching cell 22. This is a notched signal in phase opposition with respect to the control signal of the elementary switch K3$l$ to within a dead time value.

In FIG. 4.13 has been represented a timechart of the output voltage Vs of the switching structure with four voltage levels of FIG. 2 and in which the four voltage levels are clearly visible: 0V, 2000V, 4000V, 6000V.

Of interest now is an exemplary converter arm B which is the subject of the invention comprising only two stages Et1, Et2 and therefore three switching structures with four voltage levels Ce10, Ce21, Ce22 like that described in FIG. 2.

This arm will be succinctly described while referring to FIG. 3A. This arm is configured to perform a DC/AC conversion. In the description which follows, for simplicity the energy storage devices have been called capacitors. This is not limiting. The single switching structure with four voltage levels Ce10 of the stage of rank one Et1 comprises a cell of floating capacitor type formed of the extreme elementary switches T2, T2', of the median elementary switches T1, T1', and of the capacitor C12, a first basic switching cell with the elementary switches T3$u$ and T3'$u$, a second basic switching cell with the elementary switches T3$l$ and T3'$l$, a capacitive divider bridge with the capacitors C9, C10, C11. The capacitor C9 and the capacitor C10 have a common node N7, the capacitor C10 and the capacitor C11 have a common node N8.

The first switching structure with four voltage levels Ce21 of the second stage Et2, linked via the inductor Laux21 to the first basic switching cell of the first stage Et1 at the level of the node N6, comprises a cell of floating capacitor type formed of the extreme elementary switches T5$u$, T5'$u$, of the median elementary switches T4$u$, T4'$u$, and of the capacitor C7, a first basic switching cell with the elementary switches T6$u$ and T6'$u$, a second basic switching cell with the elementary switches T7$u$ and T7'$u$, a capacitive divider bridge with the capacitors C1, C2, C3. The capacitor C1 and the capacitor C2 have a common node N1, and the capacitor C2 and the capacitor C3 have a common node N2.

The second switching structure with four voltage levels Ce22 of the second stage Et2, linked via the inductor Laux22 at the level of the node N9 to the second basic switching cell of the first stage Et1, comprises a cell of floating capacitor type formed of the extreme elementary switches T5$l$, T5'$l$, of the median elementary switches T4$l$, T4'$l$, and of the capacitor C8, a first basic switching cell with the elementary switches T7$l$ and T7'$l$, a second basic switching cell with the elementary switches T6$l$ and T6'$l$, a capacitive divider bridge with the capacitors C4, C5, C6. The capacitor C3 and the capacitor C4 have a common node N3, and the capacitor C5 and the capacitor C6 have a common node N5.

The two capacitive divider bridges C1-C3, C4-C6 of the second stage Et2 are connected in series.

The voltage source VDC is intended to be wired up between the extreme terminals of the two capacitive divider bridges. Thus the terminal E+ corresponds to a capacitor C1 terminal that is not linked to another capacitor and the terminal E−corresponds to a capacitor C6 terminal that is not linked to another capacitor.

Subsequently, for the sake of simplification, the reference VDC will represent both the voltage source and the voltage across the terminals of this voltage source.

The voltage VDC has been split into two groups of three equal voltages E1-E3 and E4-E6, the voltage E1 being applied to the terminals of capacitor C1, the voltage E2 being applied to the terminals of capacitor C2, the voltage E3 being applied to the terminals of capacitor C3, the voltage E4 being applied to the terminals of capacitor C4, the voltage E5 being applied to the terminals of capacitor C5, the voltage E6 being applied to the terminals of capacitor C6. The voltage across the terminals of the capacitor C7 is called E7. The voltage across the terminals of the capacitor C8 is called E8. The voltage across the terminals of the capacitor C12 is called E12.

A floating voltage Ef is available between the terminals N6, N9 of the inductors Laux21, Laux22, on the side of the switching structure with four voltage levels of the first stage Et1. This floating voltage Ef is used as input voltage of the first stage Et1; it is subdivided into three equal floating voltages E9, E10, E11 applied respectively to the terminals of the capacitors C9, C10, C11.

The conversion function which relates the input voltage Ef and the output voltage Es of the switching structure with four voltage levels Ce10 of the first stage Et1 is called fc1. The input voltage Ef of the switching structure Ce10 corresponds to E9+E10+E11. The output voltage Es of the switching structure Ce10 is taken between the node N9 and the node S.

The conversion function which relates the input voltage VDC/2 and the output voltage $V_{N3N6}$ of the first switching structure with four voltage levels Ce21 of the second stage Et2 is called fc2. The input voltage VDC/2 of the switching structure with four voltage levels Ce21 corresponds to E1+E2+E3. The output voltage $V_{N6N3}$ of the conversion structure Ce21 is taken between the node N3 and the node N6.

The conversion function which relates the input voltage VDC/2 and the output voltage $V_{E-N9}$ of the second switching structure C with four voltage levels e22 of the second stage Et2 is called fc3. The input voltage VDC/2 of the switching structure with four voltage levels Ce22 corresponds to E4+E5+E6. The output voltage $V_{N9E-}$ of the conversion structure Ce22 is taken between the node E− and the node N9.

By choosing the components of the two switching structures with four voltage levels Ce21 and Ce22 of the second stage Et2 in such a way that the voltages which are applied to the terminals of the two capacitive divider bridges are indeed equal to VDC/2 and by choosing equal conversion functions fc2 and fc3, the voltages applied at the input of each of the three switching structures with four voltage levels Ce10, Ce21, Ce22 are equal to VDC/2. There is a balanced distribution of the voltages between each switching structure with four voltage levels. These switching structures with four voltage levels then have to support only half the input voltage, thus corresponding to the specified objective.

In the arm illustrated in FIG. 3A, the controls of the elementary switches T3$u$ and T3$l$ are identical, the controls of the elementary switches T4$u$ and T4$l$ are identical, the controls of the elementary switches T5$u$ and T5$l$ are identical, the controls of the elementary switches T6$u$ and T6$l$ are identical, and the controls of the elementary switches T7$u$ and T7$l$ are identical. Moreover, as stated above when describing FIG. 2, the controls of the elementary switches T6$u$ and T7$u$ are identical and the controls of the elementary switches T6$l$ and T7$l$ are identical.

With its three switching structures with four voltage levels, such an arm B possesses six switching functions F10, F20, F30, F40, F50, F60.

The switching function F10 is used for the control of the pair of elementary switches T1, T1' in the median position of the cell of floating capacitor type of the switching structure with four voltage levels of the first stage Et1.

The switching function F20 is used for the control of the pair of elementary switches T2, T2' in the extreme position of the cell of floating capacitor type of the switching structure with four voltage levels of the first stage Et1.

The switching function F30 is used for the control of the elementary switches T3$u$, T3'$u$, T3$i$, T3'$l$ of the basic switching cells of the switching structure with four voltage levels of the first stage Et1.

The switching function F40 is used for the control of the pairs of elementary switches T4$u$, T4'$u$, T4$l$, T4'$l$ in the median position of the two cells of floating capacitor type situated in the switching structures with four voltage levels of the second stage Et2.

The switching function F50 is used for the control of the pairs of elementary switches T5$u$, T5'$u$, T5$l$, T5'$l$ in the extreme position of the two cells of floating capacitor type situated in the switching structures with four voltage levels of the second stage Et2.

The switching function F60 is used for the control of the elementary switches T6$u$, T6'$u$, T7$u$, T7'$u$, T7$l$, T7'$l$, T6$l$, T6'$l$ of the basic switching cells of the switching structures with four voltage levels of the second stage Et2. It is possible to refer to the description of FIG. 2 as regards the values taken by these switching functions as a function of the enabled or disabled state of the elementary switches.

The converter of FIG. 3A makes it possible to obtain at output 7 different voltage levels 0, VDC/6, 2VDC/6, 3VDC/6, 4VDC/6, 5VDC/6, VDC between the nodes S and E− and 64 states as a function of the enabled or disabled state of its elementary switches.

The 64 different states as well as the 7 corresponding voltage levels Vs at the output of the first stage Et1 have been grouped together in the following table. The voltage Vs is taken between the node S and the terminal E−. The output voltage, Vs is expressed by:

$$Vs=[F10+F20+F30+F40+F50+F60]VDC/2$$

| State | F10 | F20 | F30 | F40 | F50 | F60 | Vs |
|---|---|---|---|---|---|---|---|
| 1 | 0 | 0 | 0 | 0 | 0 | 0 | 0 |
| 2 | 0 | 0 | 0 | 0 | 0 | 1 | VDC/6 |
| 3 | 0 | 0 | 0 | 0 | 1 | 0 | VDC/6 |
| 4 | 0 | 0 | 0 | 0 | 1 | 1 | 2 VDC/6 |
| 5 | 0 | 0 | 0 | 1 | 0 | 0 | VDC/6 |
| 6 | 0 | 0 | 0 | 1 | 0 | 1 | 2 VDC/6 |
| 7 | 0 | 0 | 0 | 1 | 1 | 0 | 2 VDC/6 |
| 8 | 0 | 0 | 0 | 1 | 1 | 1 | 3 VDC/6 |
| 9 | 0 | 0 | 1 | 0 | 0 | 0 | VDC/6 |
| 10 | 0 | 0 | 1 | 0 | 0 | 1 | 2 VDC/6 |
| 11 | 0 | 0 | 1 | 0 | 1 | 0 | 2 VDC/6 |
| 12 | 0 | 0 | 1 | 0 | 1 | 1 | 3 VDC/6 |
| 13 | 0 | 0 | 1 | 1 | 0 | 0 | 2 VDC/6 |
| 14 | 0 | 0 | 1 | 1 | 0 | 1 | 3 VDC/6 |
| 15 | 0 | 0 | 1 | 1 | 1 | 0 | VDC/6 |
| 16 | 0 | 0 | 1 | 1 | 1 | 1 | 3 VDC/6 |
| 17 | 0 | 1 | 0 | 0 | 0 | 0 | VDC/6 |
| 18 | 0 | 1 | 0 | 0 | 0 | 1 | 2 VDC/6 |
| 19 | 0 | 1 | 0 | 0 | 1 | 0 | 2 VDC/6 |
| 20 | 0 | 1 | 0 | 0 | 1 | 1 | 2 VDC/6 |

-continued

| State | F10 | F20 | F30 | F40 | F50 | F60 | Vs |
|---|---|---|---|---|---|---|---|
| 21 | 0 | 1 | 0 | 1 | 0 | 0 | 2 VDC/6 |
| 22 | 0 | 1 | 0 | 1 | 0 | 1 | 3 VDC/6 |
| 23 | 0 | 1 | 0 | 1 | 1 | 0 | 3 VDC/6 |
| 24 | 0 | 1 | 0 | 1 | 1 | 1 | 4 VDC/6 |
| 25 | 0 | 1 | 1 | 0 | 0 | 0 | 2 VDC/6 |
| 26 | 0 | 1 | 1 | 0 | 0 | 1 | 3 VDC/6 |
| 27 | 0 | 1 | 1 | 0 | 1 | 0 | 3 VDC/6 |
| 28 | 0 | 1 | 1 | 0 | 1 | 1 | 4 VDC/6 |
| 29 | 0 | 1 | 1 | 1 | 0 | 0 | 3 VDC/6 |
| 30 | 0 | 1 | 1 | 1 | 0 | 1 | 4 VDC/6 |
| 31 | 0 | 1 | 1 | 1 | 1 | 0 | 4 VDC/6 |
| 32 | 0 | 1 | 1 | 1 | 1 | 1 | 4 VDC/6 |
| 33 | 1 | 0 | 0 | 0 | 0 | 0 | VDC/6 |
| 34 | 1 | 0 | 0 | 0 | 0 | 1 | 2 VDC/6 |
| 35 | 1 | 0 | 0 | 0 | 1 | 0 | 2 VDC/6 |
| 36 | 1 | 0 | 0 | 0 | 1 | 1 | 3 VDC/6 |
| 37 | 1 | 0 | 0 | 1 | 0 | 0 | 2 VDC/6 |
| 38 | 1 | 0 | 0 | 1 | 0 | 1 | 3 VDC/6 |
| 39 | 1 | 0 | 0 | 1 | 1 | 0 | 3 VDC/6 |
| 40 | 1 | 0 | 0 | 1 | 1 | 1 | 4 VDC/6 |
| 41 | 1 | 0 | 1 | 0 | 0 | 0 | 2 VDC/6 |
| 42 | 1 | 0 | 1 | 0 | 0 | 1 | 3 VDC/6 |
| 43 | 1 | 0 | 1 | 0 | 1 | 0 | 3 VDC/6 |
| 44 | 1 | 0 | 1 | 0 | 1 | 1 | 4 VDC/6 |
| 45 | 1 | 0 | 1 | 1 | 0 | 0 | 3 VDC/6 |
| 46 | 1 | 0 | 1 | 1 | 0 | 1 | 4 VDC/6 |
| 47 | 1 | 0 | 1 | 1 | 1 | 0 | 4 VDC/6 |
| 48 | 1 | 0 | 1 | 1 | 1 | 1 | 4 VDC/6 |
| 49 | 1 | 1 | 0 | 0 | 0 | 0 | 2 VDC/6 |
| 50 | 1 | 1 | 0 | 0 | 0 | 1 | 3 VDC/6 |
| 51 | 1 | 1 | 0 | 0 | 1 | 0 | 3 VDC/6 |
| 52 | 1 | 1 | 0 | 0 | 1 | 1 | 4 VDC/6 |
| 53 | 1 | 1 | 0 | 1 | 0 | 0 | 3 VDC/6 |
| 54 | 1 | 1 | 0 | 1 | 0 | 1 | 4 VDC/6 |
| 55 | 1 | 1 | 0 | 1 | 1 | 0 | 4 VDC/6 |
| 56 | 1 | 1 | 0 | 1 | 1 | 1 | 4 VDC/6 |
| 57 | 1 | 1 | 1 | 0 | 0 | 0 | 3 VDC/6 |
| 58 | 1 | 1 | 1 | 0 | 0 | 1 | 4 VDC/6 |
| 59 | 1 | 1 | 1 | 0 | 1 | 0 | 4 VDC/6 |
| 60 | 1 | 1 | 1 | 0 | 1 | 1 | 5 VDC/6 |
| 61 | 1 | 1 | 1 | 1 | 0 | 0 | 4 VDC/6 |
| 62 | 1 | 1 | 1 | 1 | 0 | 1 | 5 VDC/6 |
| 63 | 1 | 1 | 1 | 1 | 1 | 0 | 5 VDC/6 |
| 64 | 1 | 1 | 1 | 1 | 1 | 1 | VDC |

By analysing this table, it is appreciated that several states and therefore several configurations of the elementary switches lead to one and the same voltage Vs. This degree of freedom is beneficial for maintaining the balance of the floating voltages. This degree of freedom will be used to maintain the balance of the voltages of the capacitors.

In FIG. 5.1 has been represented the shape of the setpoint voltage Vref which will serve in particular to determine the switching instants of all the elementary switches of the arm B illustrated in FIG. 3A. It corresponds to that illustrated in FIG. 4.1. It is in phase with the voltage Vs at the output of the stage Et1 taken between the node S and the node E-, illustrated in FIG. 5.14.

In FIG. 5.2 has been represented a timechart of the carrier Car10 used with the setpoint voltage Vref to achieve the switching function F10 and determine the switching instants of the elementary switches T1, T1' of the switching structure with four voltage levels Ce10 of the first stage Et1. It is a triangular carrier whose amplitude lies between −1 and +1.

In FIG. 5.3 has been represented a timechart of the carrier Car20 used with the setpoint voltage Vref to achieve the switching function F20 and determine the switching instants of the elementary switches T2, T2' in the extreme position of the cell of floating capacitor type of the switching structure with four voltage levels Ce10 of the first stage Et1. It is a triangular carrier whose amplitude lies between −1 and +1.

The carrier Car20 is shifted by $\pi$ or by ½fsw with respect to the carrier Car10. The magnitude fsw represents the chopping frequency, and it is much higher than the frequency of the output voltage Vs illustrated in FIG. 5.14.

In FIG. 5.4 has been represented a timechart of the carrier Car30 used with the setpoint voltage Vref to achieve the switching function F30 and determine the switching instants of the elementary switches T3u, T3'u, T3l, T3'l of the basic switching cells of the switching structure with four voltage levels Ce10 of the first stage Et1. The carrier Car30 is shifted by $\pi/2$ or by 1/fsw with respect to the carrier Car10.

In FIG. 5.5 has been represented a timechart of the carrier Car40 used with the setpoint voltage Vref to achieve the switching function F40 and determine the switching instants of the elementary switches T4u, T4'u, T4l, T4'l in the median position of the two cells of floating capacitor type situated in the switching structures with four voltage levels Ce21, Ce22 of the second stage Et2. This is a constant signal of amplitude −⅔.

In FIG. 5.6 has been represented a timechart of the carrier Car50 used with the setpoint voltage Vref to achieve the switching function F50 and determine the switching instants of the elementary switches T5u, T5'u, T5l, T5'l in the extreme position of the two cells of floating capacitor type situated in the switching structures with four voltage levels Ce21, Ce22 of the second stage Et2. This is a constant signal of zero amplitude.

In FIG. 5.7 has been represented a timechart of the carrier Car60 used with the setpoint voltage Vref to achieve the switching function F60 and determine the switching instants of the elementary switches T6u, T6'u, T7u, T7'u, T7l, T7'l, T6l, T6'l of the basic switching cells of the switching structures with four voltage levels Ce21, Ce22. This is a constant signal of amplitude +⅔.

The switching instants of the elementary switches are obtained by comparison between the triangular and constant carriers and the setpoint signal Vref. It is possible to define as rule, for example, that a switching instant of an elementary switch arises as soon as the setpoint signal is strictly greater than the carrier. It would of course have been possible to fix as rule that a switching instant of an elementary switch arises as soon as the setpoint signal is greater than or equal to the carrier.

FIG. 5.8 is a timechart of the switching function F10 used for the control of the pair of elementary switches T1, T1' in the median position of the cell of floating capacitor type of the switching structure with four voltage levels of the first stage Et1. This is a notched signal whose period is equal to that of the chopping frequency fsw. The switching function F10 is at a level 1 as long as the setpoint voltage Vref is greater than the carrier Car10.

The controls of the two switches T1 and T1' of the pair are obtained on the basis of the switching function F10. The control of the elementary switch T1 is similar to the switching function F10 apart from the difference that the rising edge of the notches is delayed by a dead time with respect to the rising edge of the notches of the switching function F10. On the other hand the falling edge of the notches for the control of the elementary switch T1 is synchronized with that of the notches of the switching function F10. The control of the elementary switch T1' is similar to a function complementary to the switching function F10 apart from the difference that the rising edge of the notches is delayed by the dead time with respect to the rising edge of the notches of the complementary function. On the other hand, the falling edge of the notches for the control of the elementary switch T1' is synchronized with that of the notches of the function complementary to the switching function F10. The two elementary switches T1, T1' of the pair are in complementary states to within the value of the dead time.

FIG. 5.9 is a timechart of the switching function F20 used for the control of the pair of elementary switches T2, T2' of the switching structure with four voltage levels Ce10 of the first stage Et1. This is a notched signal whose period is equal to that of the chopping frequency fsw. The switching function F20 is at a level 1 as long as the setpoint voltage Vref is greater than the carrier Car20. What has just been explained in respect of the control of the elementary switches T1, T1' and of the dead times applies for the control of the pair of elementary switches T2, T'2 on the basis of the notched signal of the switching function F20. The two elementary switches T2, T2' of the pair are in complementary states to within the value of the dead time.

FIG. 5.10 is a timechart of the switching function F30 used for the control of the pairs of elementary switches (T3$u$, T3'$u$) and (T3$l$, T3'$l$) of the basic switching cells of the switching structure with four voltage levels Ce10 of the first stage Et1. This is a notched signal whose period is equal to that of the chopping frequency fsw. The switching function F30 is at a level 1 as long as the setpoint voltage Vref is greater than the carrier Car30. What has just been explained in respect of the control of the elementary switches T1, T1' and of the dead times applies for the control of the pairs of elementary switches (T3$u$, T3'$u$) and (T3$l$, T3'$l$) on the basis of the notched signal of the switching function F30. The two elementary switches of each pair (T3$u$, T3'$u$) and (T3$l$, T3'$l$) are in complementary states to within the value of the dead time.

FIG. 5.11 is a timechart of the switching function F40 used for the control of the pairs of elementary switches (T4$u$, T4'$u$) and (T4$l$, T4'$l$) in the median position of the two cells of floating capacitor type situated in the switching structures with four voltage levels Ce21, Ce22 of the second stage Et2. This is a notched signal whose period is equal to that of the setpoint signal Vref. The switching function F40 is at a level 1 as long as the setpoint voltage Vref is greater than the carrier Car40. What has just been explained in respect of the control of the elementary switches T1, T1' and of the dead times applies for the control of the pairs of elementary switches (T4$u$, T4'$u$) and (T4$l$, T4'$l$) on the basis of the notched signal of the switching function F40. The two elementary switches of each pair (T4$u$, T4'$u$) and (T4$l$, T4'$l$) are in complementary states to within the value of the dead time.

FIG. 5.12 is a timechart of the switching function F50 used for the control of the pairs of elementary switches (T5$u$, T5'$u$) and (T5$l$, T5'$l$) in the extreme position of the two cells of floating capacitor type situated in the switching structures with four voltage levels Ce21, Ce22 of the second stage Et2. This is a notched signal whose period is equal to that of the setpoint signal Vref. The switching function F50 is at a level 1 as long as the setpoint voltage Vref is greater than the carrier Car50. What has just been explained in respect of the control of the elementary switches T1, T1' and of the dead times applies for the control of the pairs of elementary switches (T5$u$, T5'$u$) and (T5$l$, T5'$l$) on the basis of the notched signal of the switching function F50. The two elementary switches of each pair (T5$u$, T5'$u$) and (T5$l$, T5'$l$) are in complementary states to within the value of the dead time.

FIG. 5.13 is a timechart of the switching function F60 used for the control of the pairs of elementary switches (T6$u$, T6'$u$), (T7$u$, T7'$u$) and (T6$l$, T6'$l$), (T7$l$, T7'$l$) of the basic switching cells of the switching structures with four voltage levels Ce21, Ce22 of the second stage Et2. This is a notched signal whose period is equal to that of the setpoint signal Vref. The switching function F60 is at a level 1 as long as the setpoint voltage Vref is greater than the carrier Car60. What has just been explained in respect of the control of the elementary switches T1, T1' and of the dead times applies for the control of the pairs of elementary switches (T6$u$, T6'$u$), (T7$u$, T7'$u$) and (T6$l$, T6'$l$), (T7$l$, T7'$l$) on the basis of the notched signal of the switching function F60. The two elementary switches of each pair (T6$u$, T6'$u$), (T7$u$, T7'$u$) and (T6$l$, T6'$l$), (T7$l$, T7'$l$) are in complementary states to within the value of the dead time.

In FIG. 5.14 has been represented a timechart of the output voltage Vs of the converter arm illustrated in FIG. 3A in which the seven voltage levels are clearly visible: 0V, 1000V, 2000V, 3000V, 4000V, 5000V, 6000V. The voltage varies in tiers, of 1000V in the example described.

Figure 3B:
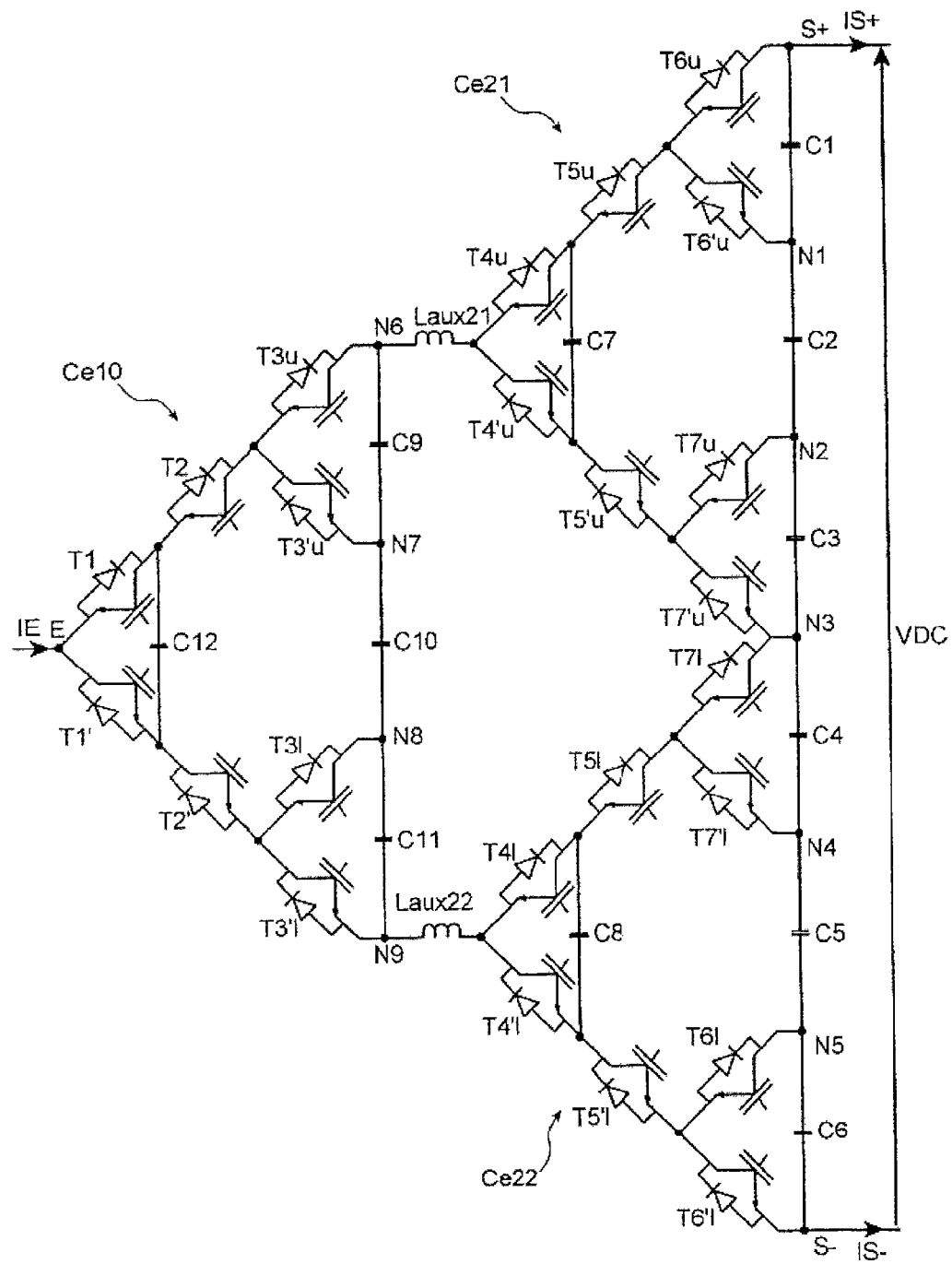

The converter arm of FIG. 3B will not be described in greater detail. It has the same structure as the arm of FIG. 3A with the exception of the fact that the node S which corresponded to the output in FIG. 3A is now called node E since it now corresponds to the input. It is intended to be connected to an AC current source (not represented). Likewise the input terminals E+, E− in FIG. 3A, at the level of which the voltage source VDC has to be wired, are now called S+ and S− in FIG. 3B, and they correspond to the output of the converter and are intended to supply a DC voltage source (not represented). During rectifier operation, a current IE flows from the node E to the output terminals S+ and S− whereas during inverter operation currents IE+ and IE− flowed from the terminals E+, E− to the node S. During rectifier operation currents IS+ and IS− occurring at the terminals S+ and S− are output currents, and during inverter operation the output current called Is occurs at the node S.

Several types of control can be used to enable or disable the elementary switches and therefore ensure conversion. A traditional control based on pulse width modulation PWM can be used. Of course, the homologous elementary switches of the two switching structures with four voltage levels Ce21, Ce22 of the second stage Et2 are controlled in the same manner.

In FIGS. 3A, 3B, a single DC voltage source VDC has been represented. This DC voltage source VDC could of course consist of several independent elementary DC voltage sources, each mounted across the terminals of at least one energy storage device C1 to C6. These DC voltage sources can be rectifiers. This configuration is beneficial in a non-reversible conversion system with a transformer having several windings.

Referring to FIG. 6, a variable speed drive has been represented, which comprises in cascade a converter 1 which is the subject of the invention operating as AC/DC rectifier and a converter 2 which is the subject of the invention operating as DC/AC inverter by placing between the two, DC side a voltage source 3 such as an energy storage device. The rectifier 1 is intended to be connected at input to an AC electrical power supply network Re that may be regarded as a current source. The inverter 2 is intended to be connected at output to a user device that may be regarded as a current source such as an AC motor Mo. FIG. 6 illustrates an example where the two converters 1 and 2 are three-phase. They would each comprise three arms such as those represented in FIGS. 3A, 3B.

The multi-level converter which is the subject of the invention is much more compact and lightweight than the converters of the prior art with transformer. It is much easier to install and to transport. It can be used with or without isolation transformer.

It makes it possible to minimize the harmonic pollution of the electrical network and the correction of the power factor when a regenerative active rectifier is used. The converter which is the subject of the invention is compatible with the AC network up to 13.8 kV, given the voltage withstand of today's existing semi-conducting components, whether it is operating as an inverter or rectifier. Therefore, it is not obligatory to use a voltage level adaptation transformer, the solution conventionally used.

The DC/AC converter which is the subject of the invention can be used to power fleets of asynchronous or synchronous motors be they new or existing.

The converter which is the subject of the invention has a modular structure by virtue of employing the switching structures with four voltage levels like those of FIG. 2. It follows therefrom that the maintenance expenses are reduced and that the reliability is good.

The supply waveform powering the load is of good quality and the overvoltages on the current source side are limited and are related only to the linking cables.

The common DC bus can serve to power several converters that are the subject of the invention.

DOCUMENTS CITED

[1] "A novel hybrid-clamped four-level converter", Kui Wang et al, Applied Power Electronics Conference and Exposition (APEC), 2012 Twenty-Seventh Annual IEEE, 5-9 Feb. 2012, pages 2442-2447.
[2] "Voltage balancing control of a four-level hybrid-clamped inverter using modified phase-shifted PWM" Kui Wang et al, Power Electronics and Applications (EPE), 2013 15th European Conference on Power Electronics and Applications, 2-6 Sep. 2013, pages 1-10.

The invention claimed is:

1. A multi-level converter comprising:
at least one arm formed of several stages of rank one to n, n being an integer greater than one, mounted in cascade, a stage of rank one being connected to a current source and a stage of rank n being connected to a voltage source,
wherein the stage of rank one comprises a single switching structure with four voltage levels and a stage of rank i, i lying between two and n, comprises i identical switching structures, each switching structure including four voltage levels mounted in series,
wherein each of these switching structures comprises a cell of floating capacitor type with three voltage levels comprising a quadruplet of elementary switches in series possessing a middle node, and two basic cells,
wherein each basic cell is formed of a pair of elementary switches in series exhibiting two extreme terminals and a midpoint and a capacitive divider bridge having two ends and formed of a triplet of energy storage devices mounted in series, of which two energy storage devices are in the extreme position,
wherein each energy storage device in the extreme position is connected to the extreme terminals of a different basic switching cell, a midpoint of each basic switching cell being connected to a different end of the quadruplet of elementary switches, and
wherein the middle node of each cell of floating capacitor type of the stage of rank i is connected to an end of the capacitive divider bridge of a switching structure with four voltage levels of the stage of rank i-1.

2. The multi-level converter according to claim 1, wherein the energy storage devices of one and the same capacitive divider bridge have one and the same energy storage capacity and one and the same voltage withstand.

3. The multi-level converter according to claim 1, wherein the middle node of at least one cell of floating capacitor type of the stage of rank i is connected to an end of the capacitive divider bridge of a switching structure of the stage of rank i-1 via an inductor.

4. The multi-level converter according to claim 3, wherein when several inductors link the stage of rank i to the stage of rank i-1, these inductors have one and the same inductance value.

5. The multi-level converter according to claim 1, wherein the two pairs of elementary switches of the two basic switching cells of one and the same stage possess one and same switching function.

6. The multi-level converter according to claim 1, wherein during operation, the elementary switches of one and the same pair are in complementary states to within a dead time value.

7. The multi-level converter according to claim 1, wherein in the quadruplet of elementary switches of a cell of floating capacitor type two are in the extreme position and two are in the median position, the two elementary switches in the extreme position are always in complementary states and the two elementary switches in the median position are always in complementary states, one being enabled and the other being disabled.

8. The multi-level converter according to claim 1, wherein the elementary switches each comprise a controllable electronic power switch with a diode connected in antiparallel.

9. The multi-level converter according to claim 1, wherein the energy storage devices are chosen from among a capacitor, a battery, and a fuel cell.

10. A variable speed drive comprising a cascade with a first converter according to claim 1 operating as AC/DC rectifier and a second converter operating as DC/AC inverter, linked together by their DC sides by way of a voltage source.

* * * * *